US010348764B2

(12) United States Patent
Vig et al.

(10) Patent No.: US 10,348,764 B2
(45) Date of Patent: Jul. 9, 2019

(54) SYSTEM AND METHOD FOR INTERCEPTING ENCRYPTED TRAFFIC AND INDICATING NETWORK STATUS

(71) Applicant: GM GLOBAL TECHNOLOGY OPERATIONS LLC, Detroit, MI (US)

(72) Inventors: Sandeep Vig, Oakland Township, MI (US); Rajeev Ranjan, Novi, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 142 days.

(21) Appl. No.: 15/636,279

(22) Filed: Jun. 28, 2017

(65) Prior Publication Data

US 2019/0007452 A1 Jan. 3, 2019

(51) Int. Cl.
*H04L 29/06* (2006.01)
*H04L 12/66* (2006.01)
*H04L 29/08* (2006.01)

(52) U.S. Cl.
CPC ............ *H04L 63/168* (2013.01); *H04L 12/66* (2013.01); *H04L 63/0281* (2013.01); *H04L 63/0823* (2013.01); *H04L 63/123* (2013.01); *H04L 67/2861* (2013.01); *H04L 67/42* (2013.01); *H04L 69/326* (2013.01); *H04L 67/12* (2013.01)

(58) Field of Classification Search
CPC . H04L 63/123; H04L 63/168; H04L 63/0281; H04L 63/0823; H04L 67/12; H04L 67/42

USPC ..... 726/11–14; 713/152, 154, 157, 173, 175
See application file for complete search history.

(56) References Cited

U.S. PATENT DOCUMENTS

| | | | | |
|---|---|---|---|---|
| 7,529,933 | B2* | 5/2009 | Palekar | H04L 63/0428 380/255 |
| 8,230,214 | B2* | 7/2012 | Kanekar | H04L 63/166 380/277 |
| 8,438,628 | B2* | 5/2013 | Shah | H04L 63/0428 380/255 |
| 9,038,159 | B2* | 5/2015 | Koonjbearry | H04L 63/1483 726/10 |
| 2016/0119374 | A1* | 4/2016 | Williams | H04L 63/1441 713/175 |
| 2017/0180382 | A1* | 6/2017 | Taylor | H04L 63/101 |

* cited by examiner

*Primary Examiner* — Hosuk Song
(74) *Attorney, Agent, or Firm* — Lorenz & Kopf LLP

(57) ABSTRACT

A computer-implemented method for notifying a client application of an event by preventing the setup of a TLS (Transport Layer Security) secure connection between the client application and a destination server is provided. The method comprises receiving a client Hello message from a client application directed to the destination server, preventing the client Hello message from reaching the destination server, constructing a server Hello message such that the message appears to originate from the destination server, constructing a dummy certificate containing the event, constructing a Certificate message that includes the dummy certificate and appears to originate from the destination server, and transmitting the server Hello message and the Certificate message to the client application.

20 Claims, 6 Drawing Sheets

SYSTEM AND METHOD FOR INTERCEPTING ENCRYPTED TRAFFIC AND INDICATING NETWORK STATUS

TECHNICAL FIELD

The technology described in this patent document relates generally to secure communications using a secure communication protocol and more particularly to a method for providing a notification to a client by preventing a secure connection.

BACKGROUND

Modern vehicles (e.g., automobile, car, light truck, and others) may receive desired content from a back-end server using data services provided by a wireless carrier network. Sometimes the communication between the vehicle and the back-end server is conducted using a secure protocol. At times an attempted secure connection with the back-end server may be prevented because of an event. As an example, the wireless network service contract for the vehicle may have expired. If a user is informed of the event, the user may be able to take action in response to the event to allow network services to resume.

Accordingly, it is desirable to provide a method that notifies a client of an event when preventing secure communication. Furthermore, other desirable features and characteristics of the present invention will become apparent from the subsequent detailed description of the invention and the appended claims, taken in conjunction with the accompanying drawings and the background of the invention.

SUMMARY

A computer-implemented method for notifying a client application of an event by preventing the setup of a TLS (Transport Layer Security) secure connection between the client application and a destination server is provided. In one embodiment, the method includes receiving a client Hello message from a client application directed to the destination server, preventing the client Hello message from reaching the destination server, constructing a server Hello message such that the message appears to originate from the destination server, constructing a dummy certificate containing the event, constructing a Certificate message that includes the dummy certificate and appears to originate from the destination server, and transmitting the server Hello message and the Certificate message to the client application.

The client application may communicate over a wireless carrier network and the computer-implemented method may be implemented in a P-GW (packet data network gateway) or GGSN (gateway GPRS support node).

The client application may communicate over a wireless carrier network and the computer-implemented method may be implemented in a network node responsible for traffic detection.

The client application may communicate over the Internet and the computer-implemented method may be implemented in an internet service provider network node responsible for traffic detection.

Transmitting the dummy certificate to the client application in the computer-implemented method may include transmitting the dummy certificate to a client application that is configured to interpret the included event in the dummy certificate.

The included event in the computer-implemented method may be a notification that a client has exceeded its data credit.

The included event in the computer-implemented method may be a notification that a client is out of its network and roaming.

The included event in the computer-implemented method may be a notification that a contract service term has expired.

The included event in the computer-implemented method may be a notification that a network has insufficient resources.

The included event in the computer-implemented method may be a notification to a client to perform a specific action.

A network system for notifying a client application of an event by preventing the setup of a TLS (Transport Layer Security) secure connection between the client application and a destination server is provided. The network system includes one or more processors and non-transient computer readable media encoded with programming instructions configurable to cause the one or more processors to implement a method. In one embodiment, the method includes receiving a client Hello message from a client application directed to the destination server, preventing the client Hello message from reaching the destination server, constructing a server Hello message such that the message appears to originate from the destination server, constructing a dummy certificate containing the event, constructing a Certificate message that includes the dummy certificate and appears to originate from the destination server, and, and transmitting the server Hello message and the Certificate message to the client application.

The client application may communicate over a wireless carrier network and the method may be implemented in a P-GW (packet data network gateway), a GGSN (gateway GPRS support node) or a network node responsible for traffic detection.

The client application may communicate over the Internet and the method may be implemented in an internet service provider network node responsible for traffic detection.

Transmitting the dummy certificate to the client application may include transmitting the dummy certificate to a client application that is configured to interpret the included event in the dummy certificate.

The included event may be a notification that a client has exceeded its data credit, a notification that a client is out of its network and roaming, a notification that a contract service term has expired, a notification that a network has insufficient resources, or a notification to a client to perform a specific action.

A method in a client application for receiving notification of an event is provided. In one embodiment, the method includes transmitting a client Hello message to a destination server, receiving a server Hello message and Certificate message from a network device, validating a certificate received in the Certificate message, failing server authentication due to unknown Certificate, and interpreting the event in the certificate.

The client application may communicate over a wireless carrier network and the network device may comprise a P-GW (packet data network gateway), a GGSN (gateway GPRS support node) or a network node responsible for traffic detection.

The client application may communicate over the Internet and the method may be implemented in an internet service provider network node responsible for traffic detection.

The included event may be a notification that a client has exceeded its data credit, a notification that a client is out of its network and roaming, a notification that a contract service term has expired, or a notification that a network has insufficient resources.

The included event may be a notification to a client to perform a specific action.

BRIEF DESCRIPTION OF THE DRAWINGS

Aspects of the present disclosure are best understood from the following detailed description when read with the accompanying figures, wherein like numerals denote like elements.

DETAILED DESCRIPTION

The following disclosure provides many different embodiments, or examples, for implementing different features of the provided subject matter. The following detailed description is merely exemplary in nature and is not intended to limit the invention or the application and uses of the invention. Furthermore, there is no intention to be bound by any theory presented in the preceding background or the following detailed description.

Figure 1:
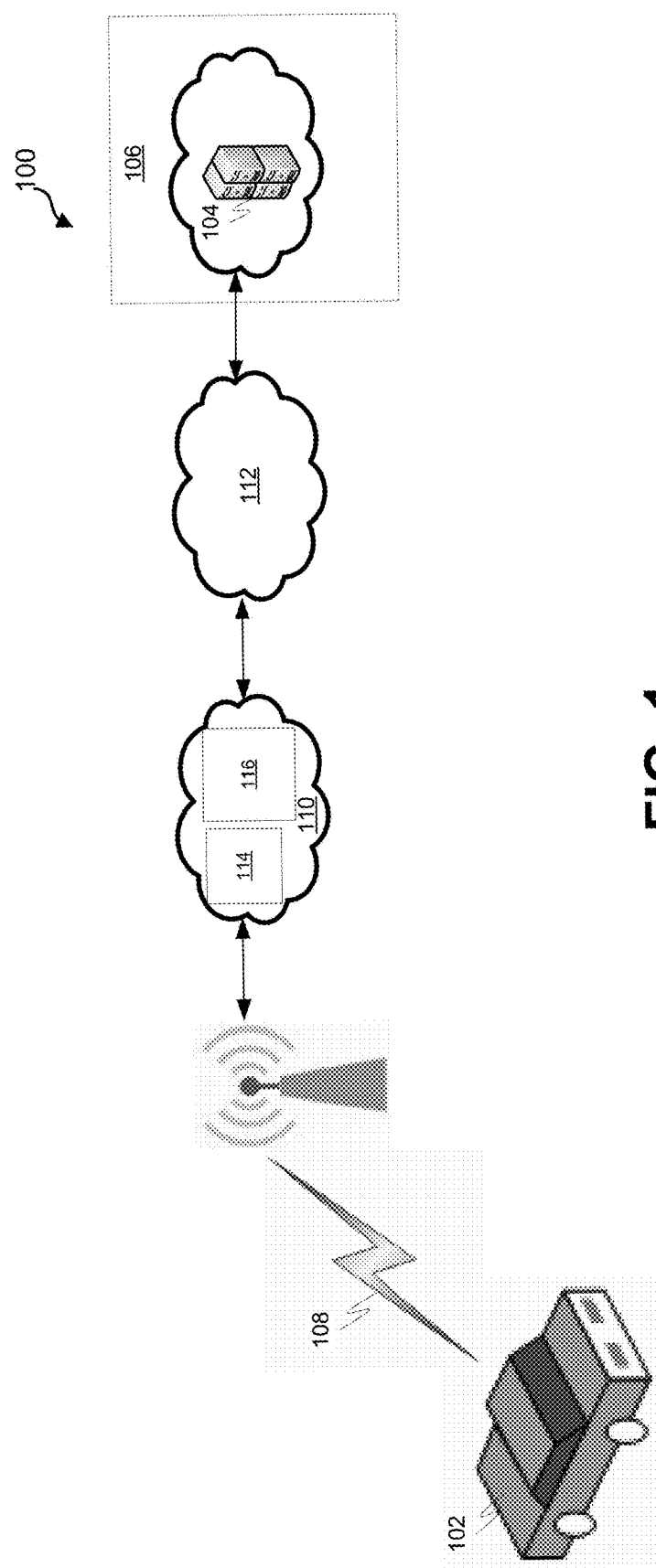
FIG. 1 is a block diagram depicting an example communication system for providing a network connection between a client and a back-end server, in accordance with some embodiments.

FIG. 1 is a block diagram depicting an example communication system 100 for providing a network connection between a vehicle or mobile station 102 and a back-end data server 104 at a host site 106. The vehicle 102 can communicate via cellular data transmissions 108 over a wireless carrier network 110 such as a cellular IP network. The wireless carrier network 110 can route data traffic to and from a packet data network (PDN) 112, e.g., a customer wide area network (WAN) or the Internet, which in turn can route data traffic to and from the host site 106 and the back-end data server 104.

The core network in the example wireless carrier network 110 includes a packet data network gateway (P-GW) 114 and/or a GGSN (gateway GPRS support node) 114 that communicates with networks outside of the wireless carrier network 110, i.e., a PDN 112. The example P-GW/GGSN 114 performs policy enforcement, e.g., gating and rate enforcement, based around the monitoring of traffic characteristics on a subscriber by subscriber basis to ensure that an agreed to traffic policy is being adhered to, packet filtering for each user, charging support, lawful interception and packet screening. The P-GW/GGSN 114 determines the IP address assigned to the vehicle 102, the security methods used, and the manner in which the wireless carrier network 110 connects with the PDN 112.

Optionally in some network implementations, the policy enforcement could be implemented on traffic detection node 116.

When a secure connection is desired between the vehicle 102 and the back-end server 104, a cryptographic protocol is used. In the example system, a transport layer security (TLS) protocol may be used to secure communications between the back-end server 104 and the vehicle 102.

When a TLS session is commenced, a TLS handshake first takes place. The TLS handshake is used to identify agreed upon security specifications, e.g., security keys, required to set up a secure connection (e.g., TLS connection) for exchanging application data using the TLS protocol between the back-end server 104 and the vehicle 102. During the TLS handshake, the back-end server 104 and the vehicle 102 negotiate over the security specifications.

Figure 2:
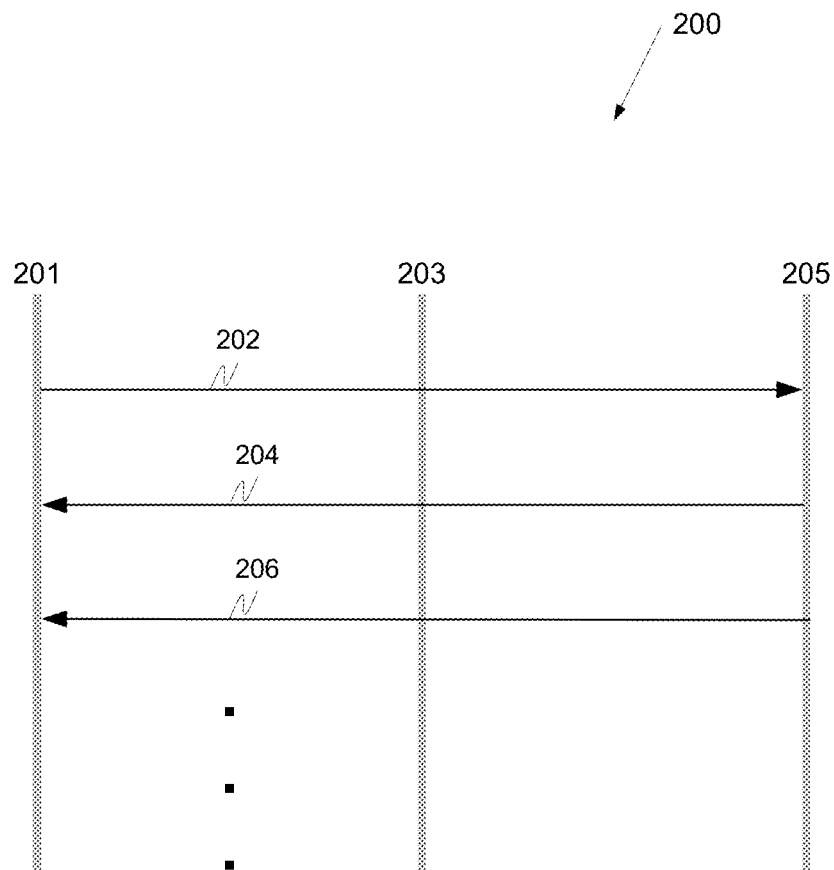
FIG. 2 is a sequence diagram depicting example communications in an example TLS handshake sequence, in accordance with some embodiments.

FIG. 2 is a sequence diagram depicting example communications in an example TLS handshake sequence 200. A client 201, e.g., a vehicle, sends a "Client Hello" message 202 to a back-end server 205. The "Client Hello" message 202 may specify the highest TLS protocol version the client 201 supports, a random number, a list of suggested cipher suites, and suggested compression methods. If the client 201 is attempting to perform a resumed handshake, it may send a session ID. If the client 201 can use Application-Layer Protocol Negotiation, it may include a list of supported application protocols, such as HTTP/2.

The server 205 responds to the client 201 with a "Server Hello" message 204. The "Server Hello" message 204 may include the chosen protocol version, a different random number, and a cipher suite and a compression method chosen from the choices offered by the client 201. To confirm or allow resumed handshakes the server 205 may send a session ID.

The server 205 may then send a "Certificate" message 206. The certificate may include information about the server's public key, information about the identity of the server 205, and the digital signature of an entity that has verified the certificate's contents.

The following example communications may also be included in the TLS handshake sequence 200. The server 205 may send a "Server Key Exchange" message. Next, the server 205 may send a "Server Hello Done" message, indicating it is finished with its part of the handshake negotiation. The client 201 may respond with a "Client Key Exchange" message, which may contain a "Pre-Master Secret" that is encrypted using the public key of the Certificate, a public key, or nothing. The client 201 and server 205 may then use the random numbers and the "Pre-Master Secret" to compute a common secret, called the "master secret." The client 201 then sends a "Change Cipher Spec" record followed by the server 205 sending a "Change Cipher Spec" record. The handshake sequence is complete at this point; the application protocol is enabled and a TLS session may be established.

The P-GW/GGSN 203, in this scenario, acts as a pass-through device. The P-GW/GGSN 203 passes the messages back and forth between the back-end server 205 and the vehicle 201. If an event needs to be notified to the client, e.g., out of data or roaming situation, a network device such as the P-GW/GGSN, or traffic detection node that performs deep packet inspections can be configured to perform dummy handshaking operations to notify the client of the event.

Figure 3:
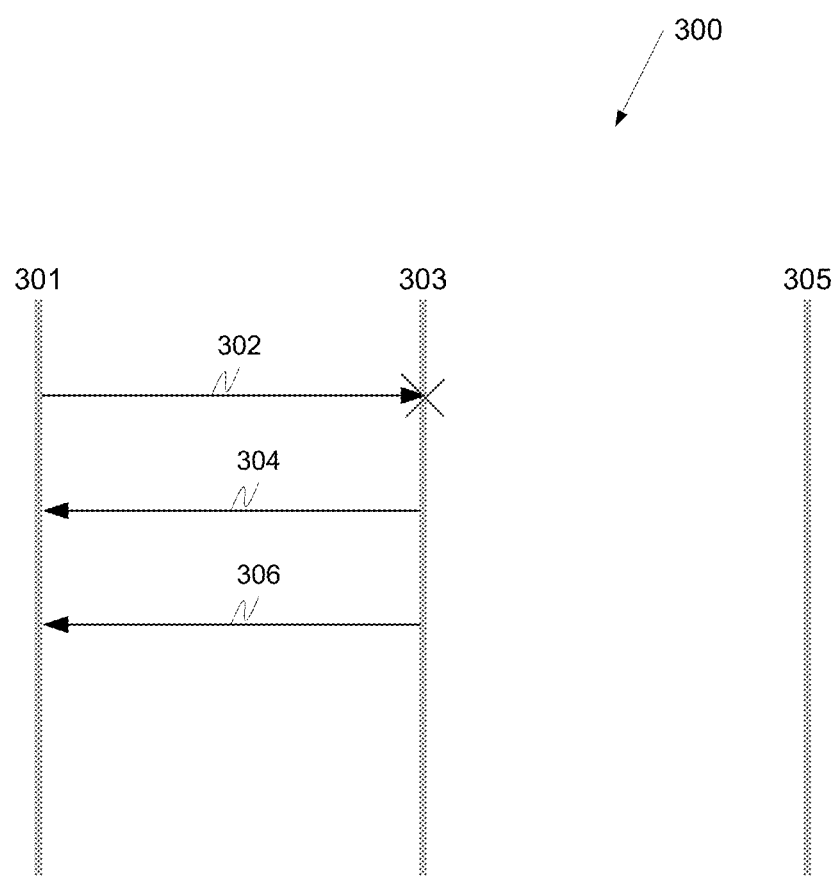
FIG. 3 is a sequence diagram depicting example operations in an example dummy handshaking sequence for notifying a client why a TLS session could not be established, in accordance with some embodiments.

FIG. 3 is a sequence diagram depicting example operations in an example dummy handshaking sequence 300 for notifying a client 301 why a TLS session was not established. A client 301, sends a "Client Hello" message 302 to a back-end server 305. The "Client Hello" message 302 may specify the highest TLS protocol version the client 301 supports, a random number, a list of suggested cipher suites, and suggested compression methods. If the client 301 is attempting to perform a resumed handshake, it may send a session ID. If the client 301 can use Application-Layer Protocol Negotiation, it may include a list of supported application protocols, such as HTTP/2.

The P-GW/GGSN 303, in this example, determines that an event has to be notified to the client, prevents the establishment of a TLS session between the client 301 and a back-end server 305 and does not forward the "Client Hello" message to the back-end server 305. The P-GW/GGSN 303 generates a "Server Hello" message 304 that that appears to originate from the back-end server 305 and transmits the fake "Server Hello" message 304 to the client 301. The P-GW/GGSN 303 also constructs a dummy "Certificate" containing the event and a dummy "Certificate" message 306 that includes the dummy certificate and appears to originate from the back-end server 305. The P-GW/GGSN 303 transmits the dummy "Certificate" message 306 to the client 301. The client 301, after receipt of the dummy "Certificate" message 306, fails the server authentication due to unexpected certificate content. The client 301 may read the dummy "Certificate" message 306 to determine the event.

Although a P-GW/GGSN is used in this example for performing dummy handshaking operations to inform the client of the reason for a failed TLS session, other network devices such as a traffic detection node may be configured to perform dummy handshaking operations to inform the client of the reason for a failed TLS session.

An event may include a notification that a client has exceeded its data credit, a notification that a client is out of its network and roaming, a notification that a contract service term has expired, a notification that a network has insufficient resources, or a notification to a client to perform a specific action.

Figure 4:
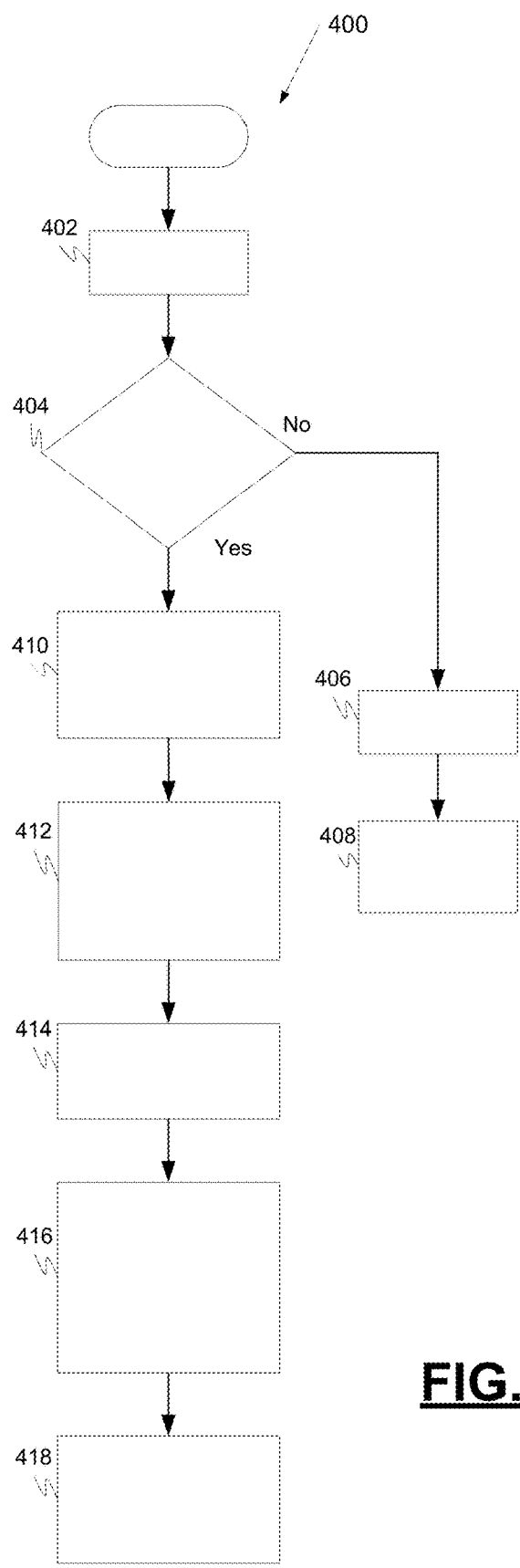
FIG. 4 is a process flow chart depicting an example process in a network device for informing a client of the reason for a failed secure connection attempt, in accordance with some embodiments.

FIG. 4 is a process flow chart depicting an example process 400 in a network device for informing a client of an event. The network device receives a client Hello message (operation 402). The network device determines if there is an event to notify to the client application (decision 404). If the network device determines that there is not an event to notify to the client application (no at decision 404), the client Hello message is forwarded to the back-end server (operation 406) and the secure connection handshake protocol may continue (operation 408). If the network device determines that there is an event to notify to the client application (yes at decision 404), the network device prevents the client Hello message from reaching the back-end server (operation 410), constructs a Server Hello message that appears to originate from the back-end server (operation 412), constructs a dummy certificate containing the event (operation 414), and constructs a Certificate message that includes the dummy certificate and appears to originate from the back-end server (operation 416). The network device transmits the Server Hello message and the Certificate message to the client (operation 418).

Figure 5:
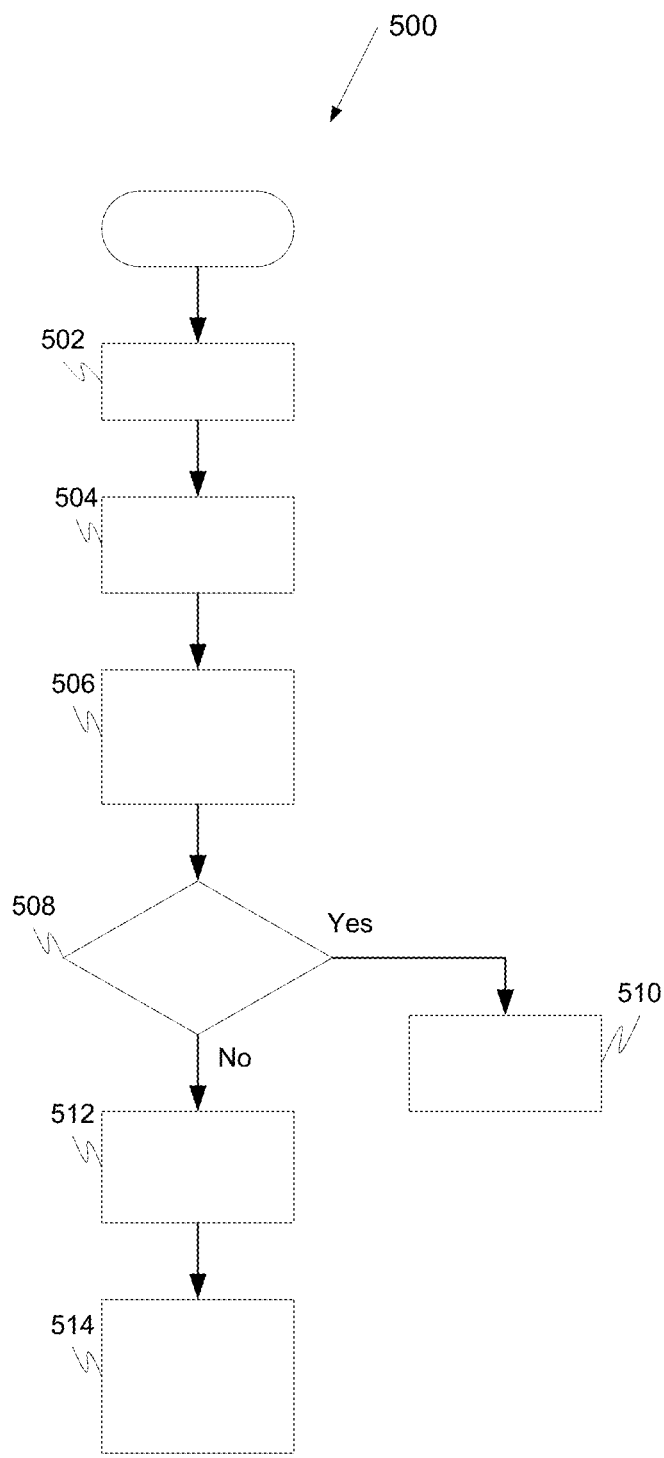
FIG. 5 is a process flow chart depicting an example process at a client for determining the reason for a failed secure connection attempt, in accordance with some embodiments.

FIG. 5 is a process flow chart depicting an example process 500 at a client for determining the reason for a failed secure connection attempt. A client desiring to establish a secure connection with a back-end server transmits a client Hello message (operation 502). The client receives a Server Hello message from a network device (operation 504). The client also receives a certificate message from the network device (operation 506). The client determines if the certificate is valid (decision 508). If the certificate is valid (yes at decision 508), the client continues the secure connection handshake protocol (operation 510). If the certificate is not valid (no at decision 508), the client fails the server authentication (operation 512). The client then reads the certificate to determine the event preventing the establishment of the secure connection (operation 514).

Figure 6:
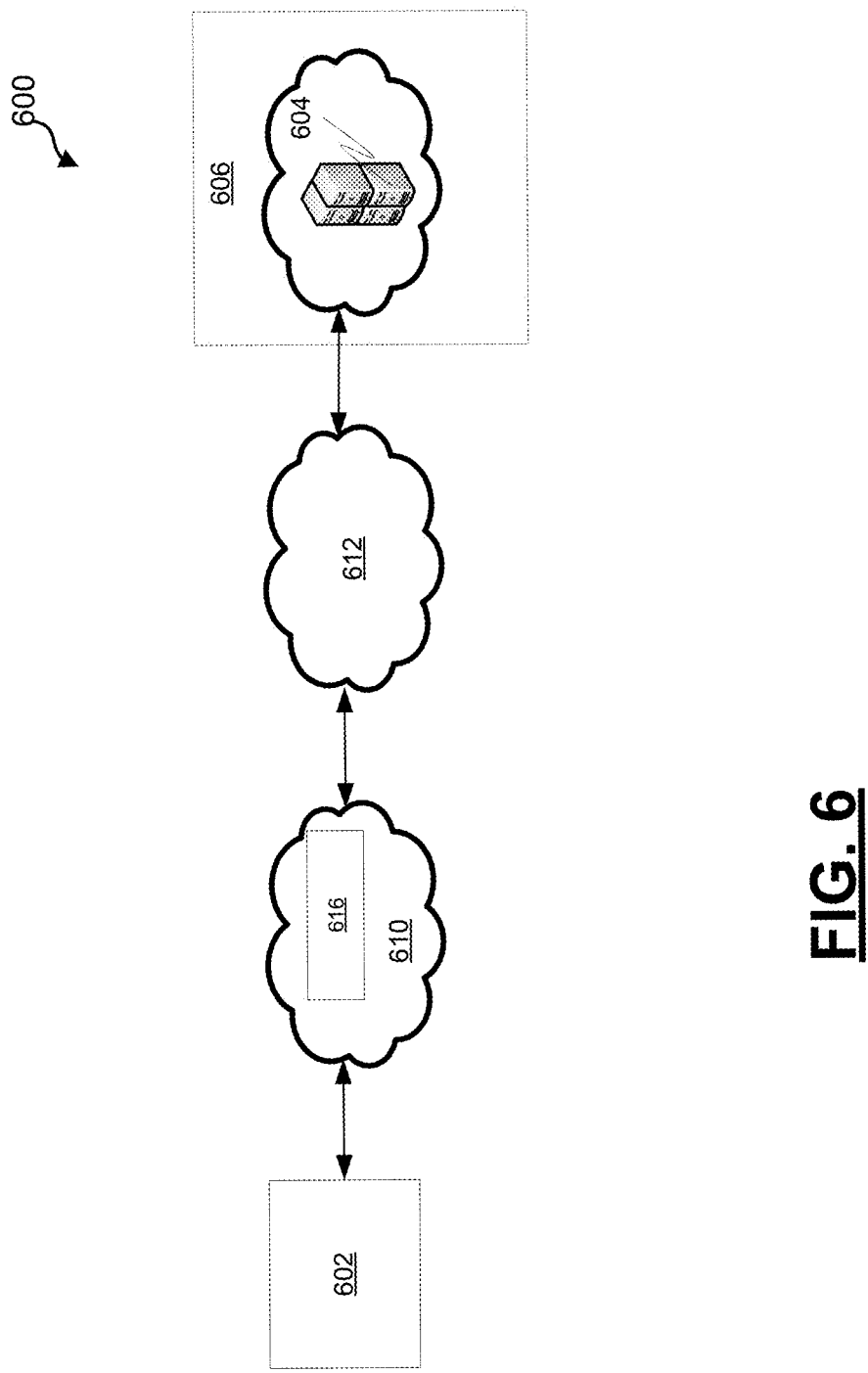
FIG. 6 is a block diagram depicting another example communication system for providing a network connection between a client application and a back-end data server, in accordance with some embodiments.

FIG. 6 is a block diagram depicting another example communication system 600 for providing a network connection between a client application 602 and a back-end data server 604 at a host site 606. The client application 602 can communicate via an Internet service provider network 610. The Internet service provider network 610 can route data traffic to and from a packet data network (PDN) 612, e.g., the Internet, which in turn can route data traffic to and from the host site 606 and the back-end data server 604.

The core network in the example Internet service provider network 610 includes a traffic detection node 616. The example traffic detection node 616 is a network node responsible for traffic detection in the example Internet service provider network 610.

When a secure connection is desired between the client application 602 and the back-end server 604, a cryptographic protocol is used. In this example system, a transport layer security (TLS) protocol may be used to secure communications between the back-end server 604 and the client application 602.

A network node or device such as example traffic detection node 616, can be configured to perform dummy handshaking operations to inform the client of an event.

A network device or node may be configured by programming instructions to perform dummy handshaking operations to inform the client of an event. A network device or node may alternatively be hardwired or configured in another way to perform dummy handshaking operations to inform the client of the event. Similarly, a client device may be configured by programming instructions, hardwired, or configured in another way to fail the server authentication and interpret a dummy certificate to determine the event preventing the establishment of a secure connection.

Described herein are apparatus, systems, techniques and articles for informing a client of an event. Dummy handshaking operations may be performed to inform a client of the event. The dummy handshaking operations may include a dummy certificate that uniquely identifies the event, e.g., out of balance or roaming or others. The client may include logic to fail server authentication due to unexpected certificate content. The client may also include logic to interpret the dummy certificate to determine the event.

In one embodiment, a computer-implemented method for notifying a client application of an event by preventing the setup of a TLS (Transport Layer Security) secure connection between the client application and a destination server is provided. The method comprises receiving a client Hello message from a client application directed to the destination server, preventing the client Hello message from reaching the destination server, constructing a server Hello message such that the message appears to originate from the destination server, constructing a dummy certificate containing the event, constructing a Certificate message that includes the dummy certificate and appears to originate from the destination server, and transmitting the server Hello message and the Certificate message to the client application.

These aspects and other embodiments may include one or more of the following features. The client application may communicate over a wireless carrier network and the method may be implemented in a P-GW (packet data network gateway) or GGSN (gateway GPRS support node). The client application may communicate over a wireless carrier network and the method may be implemented in a network node responsible for traffic detection. The client application may communicate over the Internet and the method may be implemented in an internet service provider network node responsible for traffic detection. Transmitting the dummy certificate to the client application may comprise transmitting the dummy certificate to a client application that is configured to interpret the included event in the dummy certificate. The included event may be a notification that a client has exceeded its data credit. The included event may be a notification that a client is out of its network and roaming. The included event may be a notification that a contract service term has expired. The included event may be a notification that a network has insufficient resources. The included event may be a notification to a client to perform a specific action.

In another embodiment, a network system for notifying a client application of an event by preventing the setup of a TLS (transport layer security) secure connection between the client application and a destination server is provided. The system comprises one or more processors and non-transient computer readable media encoded with programming instructions configurable to cause the one or more processors to implement a method. The method comprises receiving a client Hello message from a client application directed to the destination server, preventing the client Hello message from reaching the destination server, constructing a server Hello message such that the message appears to originate from the destination server, constructing a dummy certificate containing the event, constructing a Certificate message that includes the dummy certificate and appears to originate from the destination server, and transmitting the server Hello message and the Certificate message to the client application.

These aspects and other embodiments may include one or more of the following features. The client application may communicate over a wireless carrier network and the method may be implemented in a P-GW (packet data network gateway), a GGSN (gateway GPRS support node), or a network node responsible for traffic detection. The client application may communicate over the Internet and the method may be implemented in an internet service provider network node responsible for traffic detection. Transmitting the dummy certificate to the client application may comprise transmitting the dummy certificate to a client application that is configured to interpret the included event in the dummy certificate. The included event may be a notification that a client has exceeded its data credit. The included event may be a notification that a client is out of its network and roaming. The included event may be a notification that a contract service term has expired. The included event may be a notification that a network has insufficient resources. The included event may be a notification to a client to perform a specific action.

In another embodiment, a method in a client application for receiving notification of an event is provided. The method comprises transmitting a client Hello message to a destination server, receiving a server Hello message and Certificate message from a network device, validating a certificate received in the Certificate message, failing server authentication due to unknown Certificate, and interpreting the event in the certificate.

These aspects and other embodiments may include one or more of the following features. The client application may communicate over a wireless carrier network and the network device may comprise a P-GW (packet data network gateway), a GGSN (gateway GPRS support node), or a network node responsible for traffic detection. The client application may communicate over the Internet and the method may be implemented in an internet service provider network node responsible for traffic detection. The included event may be a notification that a client has exceeded its data credit. The included event may be a notification that a client is out of its network and roaming. The included event may be a notification that a contract service term has expired. The included event may be a notification that a network has insufficient resources. The included event may be a notification to a client to perform a specific action.

In another embodiment, a client device configured to receive notification of an event is provided. The client device comprises one or more processors and non-transient computer readable media encoded with programming instructions configurable to cause the one or more processors to implement a method. The method comprises transmitting a client Hello message to a destination server, receiving a server Hello message and Certificate message from a network device, validating a certificate received in the Certificate message, failing server authentication due to unknown Certificate, and interpreting the event in the certificate.

These aspects and other embodiments may include one or more of the following features. The client device may be configured to communicate over a wireless carrier network and the network device may comprise a P-GW (packet data network gateway), a GGSN (gateway GPRS support node), or a network node responsible for traffic detection. The client device may be configured to communicate over the Internet and the method may be implemented in an internet service provider network node responsible for traffic detection. The included event may be a notification that a client has exceeded its data credit. The included event may be a notification that a client is out of its network and roaming. The included event may be a notification that a contract service term has expired. The included event may be a notification that a network has insufficient resources. The included event may be a notification to a client to perform a specific action.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A computer-implemented method for notifying a client application of an event by preventing the setup of a TLS (Transport Layer Security) secure connection between the client application and a destination server, the method comprising:
- receiving a client Hello message from a client application directed to the destination server;
- preventing the client Hello message from reaching the destination server;
- constructing a server Hello message such that the message appears to originate from the destination server;
- constructing a dummy certificate containing the event;
- constructing a Certificate message that includes the dummy certificate and appears to originate from the destination server; and
- transmitting the server Hello message and the Certificate message to the client application, wherein the transmitting comprises transmitting the dummy certificate to a client application that is configured to interpret the included event in the dummy certificate.

2. The method of claim 1, wherein the client application communicates over a wireless carrier network and the method is implemented in a P-GW (packet data network gateway) or GGSN (gateway GPRS support node).

3. The method of claim 1, wherein the client application communicates over a wireless carrier network and the method is implemented in a network node responsible for traffic detection.

4. The method of claim 1, wherein the client application communicates over the Internet and the method is implemented in an internet service provider network node responsible for traffic detection.

5. The method of claim 1, wherein the included event is a notification that a client has exceeded its data credit.

6. The method of claim 1, wherein the included event is a notification that a client is out of its network and roaming.

7. The method of claim 1, wherein the included event is a notification that a contract service term has expired.

8. The method of claim 1, wherein the included event is a notification that a network has insufficient resources.

9. The method of claim 1, wherein the included event is a notification to a client to perform a specific action.

10. A network system for notifying a client application of an event by preventing the setup of a TLS (transport layer security) secure connection between the client application and a destination server, the system comprising:
- one or more processors;
- non-transient computer readable media encoded with programming instructions configurable to cause the one or more processors to implement a method comprising:
  - receiving a client Hello message from a client application directed to the destination server;
  - preventing the client Hello message from reaching the destination server;
  - constructing a server Hello message such that the message appears to originate from the destination server;
  - constructing a dummy certificate containing the event;
  - constructing a Certificate message that includes the dummy certificate and appears to originate from the destination server; and
  - transmitting the server Hello message and the Certificate message to the client application, wherein the transmitting comprises transmitting the dummy certificate to a client application that is configured to interpret the included event in the dummy certificate.

11. The network system of claim 10, wherein the client application communicates over a wireless carrier network and the method is implemented in a P-GW (packet data network gateway), a GGSN (gateway GPRS support node), or a network node responsible for traffic detection.

12. The network system of claim 10, wherein the client application communicates over the Internet and the method is implemented in an internet service provider network node responsible for traffic detection.

13. The network system of claim 10, wherein the included event is a notification that a client has exceeded its data credit, a notification that a client is out of its network and roaming, a notification that a contract service term has expired, or a notification that a network has insufficient resources.

14. The network system of claim 10, wherein the client application communicates over a wireless carrier network and the method is implemented in a network node responsible for traffic detection.

15. The network system of claim 10, wherein the included event is a notification to a client to perform a specific action.

16. A method in a client application for receiving notification of an event, the method comprising:
- transmitting a client Hello message to a destination server;
- receiving a server Hello message and Certificate message from a network device that has:
  - prevented the client Hello message from reaching the destination server;
  - constructed the server Hello message such that the message appears to originate from the destination server;
  - constructed a dummy certificate containing the event;
  - constructed a Certificate message which includes the dummy certificate and appears to originate from the destination server; and
  - transmitted the server Hello message and the Certificate message to the client application;
- validating the dummy certificate received in the Certificate message;
- failing server authentication due to unknown Certificate; and
- interpreting the included event in the dummy certificate.

17. The method of claim 16, wherein the client application communicates over a wireless carrier network and the network device comprises a P-GW (packet data network gateway), a GGSN (gateway GPRS support node), or a network node responsible for traffic detection.

18. The method of claim 16, wherein the client application communicates over the Internet and the method is implemented in an internet service provider network node responsible for traffic detection.

19. The method of claim 16, wherein the included event is a notification that a client has exceeded its data credit, a notification that a contract service term has expired, a notification that a client is out of its network and roaming, or a notification that a network has insufficient resources.

20. The method of claim 16, wherein the included event is a notification to a client to perform a specific action.

* * * * *